(12) United States Patent
Yang

(10) Patent No.: US 9,390,678 B2
(45) Date of Patent: Jul. 12, 2016

(54) IMAGE DISPLAY METHOD AND DEVICE

(71) Applicant: Huawei Device Co., Ltd., Shenzhen (CN)

(72) Inventor: Hong Yang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 98 days.

(21) Appl. No.: 14/324,482

(22) Filed: Jul. 7, 2014

(65) Prior Publication Data

US 2014/0320520 A1    Oct. 30, 2014

Related U.S. Application Data

(63) Continuation of application No. PCT/CN2013/070095, filed on Jan. 6, 2013.

(30) Foreign Application Priority Data

Jan. 20, 2012   (CN) .......................... 2012 1 0019089

(51) Int. Cl.
*G09G 5/02* (2006.01)
*G06T 5/00* (2006.01)
*G06T 5/40* (2006.01)
*H04N 1/60* (2006.01)
(Continued)

(52) U.S. Cl.
CPC ........ *G09G 5/02* (2013.01); *G06T 7/408* (2013.01); *H04N 9/69* (2013.01); *G09G 2320/0242* (2013.01); *G09G 2320/0276* (2013.01); *G09G 2320/0673* (2013.01)

(58) Field of Classification Search
USPC ........................................................ 345/600
See application file for complete search history.

(56) References Cited

U.S. PATENT DOCUMENTS 5,838,465 A * 11/1998 Satou .................. H04N 1/6033
                                                                358/504
5,869,248 A    2/1999 Yuan et al.
(Continued)

FOREIGN PATENT DOCUMENTS

CN    101083775 A    12/2007
CN    100450190 A    1/2009
(Continued)

OTHER PUBLICATIONS

Partial English Translation and Abstract of Japanese Patent Application No. JP2010263598A, Sep. 10, 2015, 77 pages.
(Continued)

*Primary Examiner* — Wesner Sajous
(74) *Attorney, Agent, or Firm* — Conley Rose, P.C.; Grant Rodolph; Nicholas K. Beaulieu

(57) ABSTRACT

An image display method and a device are provided. The method includes: obtaining, according to a first red, green, blue (RGB) parameter of a pixel of an image and a first gamma value corresponding to the first RGB parameter, a second RGB parameter corresponding to a second gamma value, where a second transmittance of the second RGB parameter is equal to a first transmittance of the first RGB parameter; obtaining a hue (H) parameter and a value (V) parameter according to the first RGB parameter, and obtaining a saturation (S) parameter according to the second RGB parameter; obtaining a third RGB parameter according to the H parameter, the S parameter, and the V parameter; and displaying the pixel according to the third RGB parameter.

20 Claims, 2 Drawing Sheets

(51) Int. Cl.
*H04N 5/202* (2006.01)
*H04N 9/64* (2006.01)
*H04N 5/58* (2006.01)
*H04N 9/69* (2006.01)
*G06T 7/40* (2006.01)

(56) References Cited

U.S. PATENT DOCUMENTS

| | | |
|---|---|---|
| 6,309,883 B1 | 10/2001 | Minshull et al. |
| 6,391,640 B1 | 5/2002 | Minshull et al. |
| 7,016,075 B1* | 3/2006 | Tsukada .............. H04N 1/6075 358/1.9 |
| 7,105,297 B2 | 9/2006 | Minshull et al. |
| 7,795,030 B2 | 9/2010 | Minshull et al. |
| 2005/0123193 A1* | 6/2005 | Lamberg ................ G09G 5/02 382/167 |
| 2005/0248551 A1 | 11/2005 | Pasqualini et al. |
| 2007/0153305 A1 | 7/2007 | Reid |
| 2008/0080784 A1* | 4/2008 | Ozdemir .............. H04N 1/6005 382/274 |
| 2008/0095430 A1* | 4/2008 | Jaspers .................. H04N 9/68 382/167 |
| 2009/0016587 A1* | 1/2009 | Strobel ................ A61B 6/469 382/130 |
| 2010/0053222 A1* | 3/2010 | Kerofsky ............. G09G 3/3406 345/690 |
| 2010/0259685 A1 | 10/2010 | Isobe |
| 2011/0043535 A1 | 2/2011 | Kwiatkowski et al. |

FOREIGN PATENT DOCUMENTS

| | | |
|---|---|---|
| CN | 101742340 A | 6/2010 |
| CN | 102568437 A | 7/2012 |
| EP | 2239933 A2 | 10/2010 |
| JP | 20010230941 A | 8/2001 |
| JP | 20090302906 A | 12/2009 |
| JP | 2010263598 A | 11/2010 |
| JP | 2011203437 A | 10/2011 |

OTHER PUBLICATIONS

Partial English Translation and Abstract of Japanese Patent Application No. JP2011203437A, Sep. 10, 2015, 41 pages.
Foreign Communication From A Counterpart Application, Japanese Application No. 2014-550630, Japanese Office Action dated Jul. 21, 2015, 2 pages.
Foreign Communication From A Counterpart Application, Japanese Application No. 2014-550630, English Translation of Japanese Office Action dated Jul. 21, 2015, 2 pages.
Foreign Communication From A Counterpart Application, European Application No. 13738840.1 Extended European Search Report dated May 20, 2015, 6 pages.
Foreign Communication From A Counterpart Application, Chinese Application No. 201210019089.7, Chinese Office Action dated Dec. 2, 2013, 28 pages.
Foreign Communication From A Counterpart Application, PCT Application No. PCT/CN2013/070095, English Translation of International Search Report dated Apr. 25, 2013, 3 pages.
Foreign Communication From A Counterpart Application, PCT Application No. PCT/CN2013/070095, English Translation of Written Opinion dated Apr. 25, 2013, 6 pages.

* cited by examiner

IMAGE DISPLAY METHOD AND DEVICE

CROSS-REFERENCE TO RELATED APPLICATIONS

This application is a continuation of International Application No. PCT/CN2013/070095, filed on Jan. 6, 2013, which claims priority to Chinese Patent Application No. 201210019089.7, filed on Jan. 20, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to an image processing technology, and in particular, to an image display method and a device.

BACKGROUND

In the image processing field, an application of a color adjustment technology is becoming increasingly popular. According to an existing color adjustment method, parameters of a red component (R), a green component (G), and a blue component (B) are transformed into parameters of a hue component (H), a saturation component (S), and a value component (V); one weighted processing is performed on the S parameter, that is, S' parameter=a×S parameter (color enhancement: a>1; color weakening: a<1); and the processed S parameter (that is, S' parameter), and the unprocessed H and V parameters are transformed into a new red, green, blue (RGB) parameter.

However, the one weighted processing performed on the S parameter makes the S parameter change rapidly, resulting in unsmooth transition in color adjustment and easy occurrence of a color spot, and thereby causing an image distortion.

SUMMARY

The present invention provides an image display method and a device for implementing a smooth transition in color adjustment, thereby avoiding an image distortion.

According to one aspect, a method for adjusting an image color is provided and includes: transforming, according to a first gamma curve to which a first RGB parameter of a pixel of an image belongs, the first RGB parameter into a second RGB parameter on a second gamma curve; obtaining an H parameter and a V parameter according to the first RGB parameter, and obtaining an S parameter according to the second RGB parameter; obtaining a third RGB parameter according to the H parameter, the S parameter, and the V parameter; and displaying the pixel according to the third RGB parameter.

According to another aspect, an image display device is provided and includes: an obtaining unit configured to transform, according to a first gamma curve to which a first RGB parameter of a pixel of an image belongs, the first RGB parameter into a second RGB parameter on a second gamma curve; a first transforming unit configured to obtain an H parameter and a V parameter according to the first RGB parameter, and obtain an S parameter according to the second RGB parameter; a second transforming unit configured to obtain a third RGB parameter according to the H parameter, the S parameter, and the V parameter; and a display unit configured to display the pixel according to the third RGB parameter.

It may be known from the foregoing technical solutions that, according to the embodiments of the present invention, a first RGB parameter is transformed into a second RGB parameter by using a gamma curve (that is, a first gamma value) corresponding to the first RGB parameter and another gamma curve (that is, a second gamma value). As the RGB parameter is transformed by using an exponential relationship, smooth transition in color adjustment can be ensured, and no color spot appears, thereby avoiding an image distortion.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
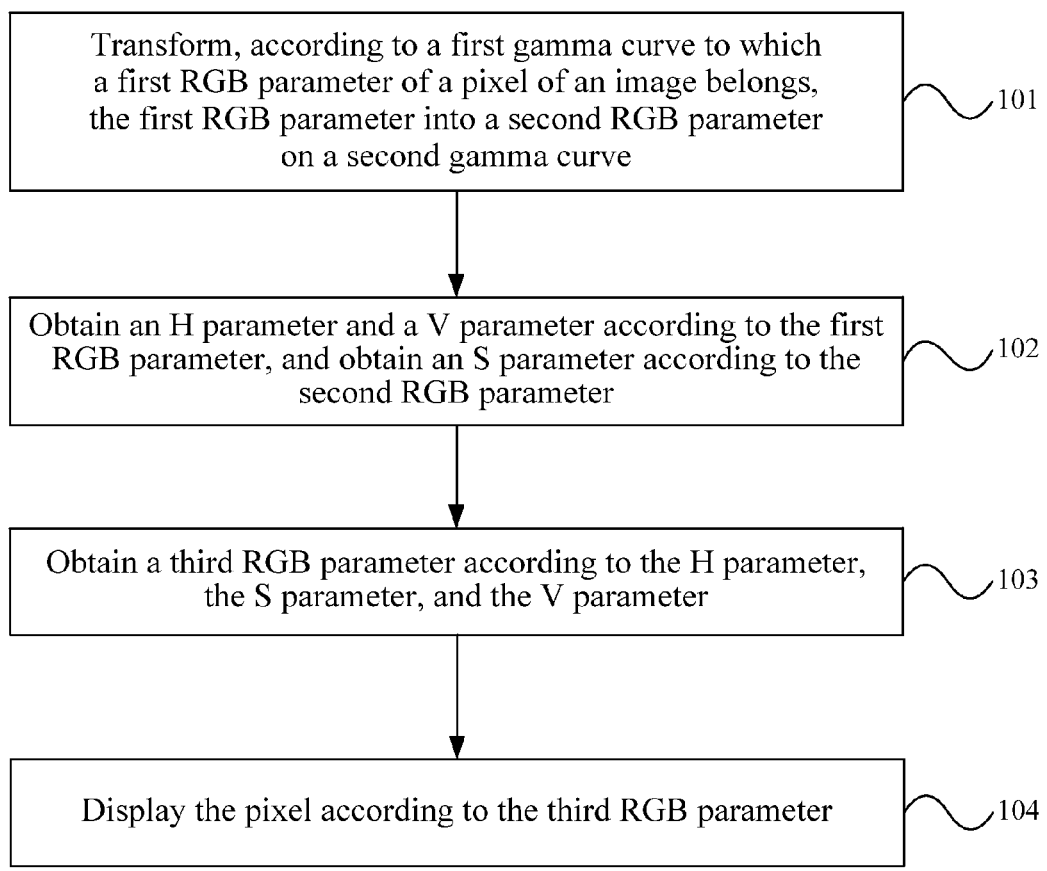
FIG. 1 is a schematic flowchart of a method for adjusting an image color according to an embodiment of the present invention.

FIG. 1 is a schematic flowchart of a method for adjusting an image color according to an embodiment of the present invention. As shown in FIG. 1, the method for adjusting an image color in this embodiment may include:

101: Transform, according to a first gamma curve to which a first RGB parameter of a pixel of an image belongs, the first RGB parameter into a second RGB parameter on a second gamma curve.

In an optional implementation manner of this embodiment of the present invention, the second RGB parameter corresponding to a second gamma value may be specifically obtained according to the first RGB parameter of the pixel of the image and a first gamma value corresponding to the first RGB parameter, where a second transmittance of the second RGB parameter is equal to a first transmittance of the first RGB parameter.

Optionally, for an application of color enhancement adjustment, the second gamma value is greater than the first gamma value.

Optionally, for an application of color weakening adjustment, the second gamma value is less than the first gamma value.

Color enhancement is used as an example in the following description. For example, the first transmittance of the first RGB parameter is T1, that is, the first gamma curve corresponding to the first RGB parameter is $T1=(X/255)^A$, where A is the first gamma value; the second transmittance of the second RGB parameter is T2, that is, the second gamma curve corresponding to the second RGB parameter is $T2=(X'/255)^B$, where B is the second gamma value, and B is greater than A. By transforming the first RGB parameter of the pixel without changing a transmittance of the pixel, which means T1=T2, obtain the second RGB parameter, that is, $X'=255\times((X/255)^A)^{(1/B)}$.

Optionally, in an embodiment, an R parameter, a G parameter, and a B parameter in the first RGB parameter may be uniformly transformed. Correspondingly, the second gamma value may include a gamma value corresponding to the R parameter, the G parameter, and the B parameter in the second RGB parameter, that is, the gamma value corresponding to the R parameter, the G parameter, and the B parameter in the second RGB parameter is a same value.

Optionally, in an application scenario of this embodiment, the R parameter, the G parameter, and the B parameter in the first RGB parameter may be selectively transformed (if there is no need to transform a parameter in the first RGB parameter, a gamma value corresponding to a parameter in the second RGB parameter may be considered to be equal to the first gamma value) or separately transformed, thereby implementing an adjustment of selective transformation. For example, a parameter to be transformed or a transformation amplitude is selected according to a theme type or a scenario type of a terminal on which the display device is located. For example, the second gamma value may include the gamma value corresponding to the R parameter in the second RGB parameter, the gamma value corresponding to the G parameter in the second RGB parameter, and the gamma value corresponding to the B parameter in the second RGB parameter, that is, the gamma value corresponding to the R parameter in the second RGB parameter is one value, and the gamma value corresponding to the G parameter and the B parameter is another value. For another example, the second gamma value may include the gamma value corresponding to the R parameter and the G parameter in the second RGB parameter, and the gamma value corresponding to the B parameter in the second RGB parameter, that is, the gamma value corresponding to the R parameter and the G parameter in the second RGB parameter is one value, and the gamma value corresponding to the B parameter is another value. For another example, the second gamma value may include the gamma value corresponding to the R parameter and the B parameter in the second RGB parameter, and the gamma value corresponding to the G parameter in the second RGB parameter, that is, the gamma value corresponding to the R parameter and the B parameter in the second RGB parameter is one value, and the gamma value corresponding to the G parameter is another value.

102: Obtain an H parameter and a V parameter according to the first RGB parameter, and obtain an S parameter according to the second RGB parameter.

For a method for obtaining a hue, saturation, value (HSV) parameter according to an RGB parameter, refer to related content in the prior art. Details are not described herein again.

With an increase of a gamma value, the H parameter in the HSV parameter remains unchanged, the S parameter increases, and the V parameter decreases.

103: Obtain a third RGB parameter according to the H parameter, the S parameter, and the V parameter.

Similarly, for a method for obtaining an RGB parameter according to an HSV parameter, refer to related content in the prior art. Details are not described herein again.

104: Display the pixel according to the third RGB parameter.

According to this embodiment, a first RGB parameter is transformed into a second RGB parameter by using a gamma curve (that is, a first gamma value) corresponding to the first RGB parameter and another gamma curve (that is, a second gamma value). As the RGB parameter is transformed by using an exponential relationship, smooth transition in color adjustment can be ensured, and no color spot appears, thereby avoiding an image distortion.

In addition, a color film with low color saturation may be appropriately used in a display device to increase its transmittance, thereby reducing the number of light-emitting diode (LED) lights in backlight and achieving an objective of reducing cost and power consumption. It should be noted that a terminal on which the display device is located may include but is not limited to a mobile phone, a personal digital assistant (PDA), a wireless handheld device, a wireless netbook, a personal computer, a portable computer, a Moving Pictures Expert Group Audio Layer III (MP3) player, a Moving Pictures Expert Group 4 (MP4) player, or the like.

It should be noted that, for brevity, each of the foregoing method embodiments is described as a combination of a series of actions; however, a person skilled in the art should know that the present invention is not limited by the sequence of actions described herein, because some steps may be performed in another sequence or simultaneously according to the present invention. In addition, a person skilled in the art should also know that, all the embodiments described in the specification are exemplary embodiments, and the actions and modules involved are not necessarily required by the present invention.

In the foregoing embodiments, the description of each embodiment has different emphases; for content that is not detailed in detail in an embodiment, refer to related description of another embodiment.

Figure 2:
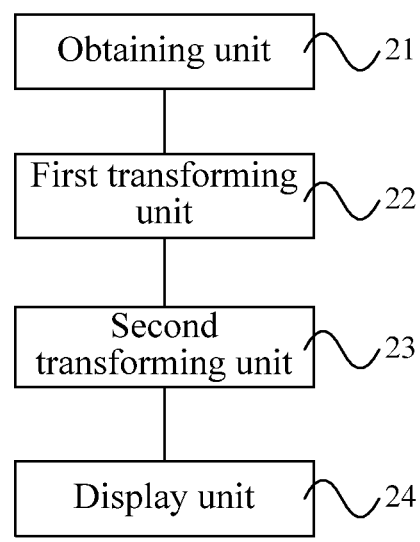
FIG. 2 is schematic structural diagram of an image display device according to another embodiment of the present invention.

FIG. 2 is schematic structural diagram of an image display device according to another embodiment of the present invention. As shown in FIG. 2, the image display device according to this embodiment may include an obtaining unit 21, a first transforming unit 22, a second transforming unit 23, and a display unit 24. The obtaining unit 21 is configured to transform, according to a first gamma curve to which a first RGB parameter of a pixel of an image belongs, the first RGB parameter into a second RGB parameter on a second gamma curve; the first transforming unit 22 is configured to obtain an H parameter and a V parameter according to the first RGB parameter, and obtain an S parameter according to the second RGB parameter obtained by the obtaining unit 21; the second transforming unit 23 is configured to obtain a third RGB parameter according to the H parameter, the S parameter, and the V parameter obtained by the first transforming unit 22; and the display unit 24 is configured to display the pixel according to the third RGB parameter obtained by the second transforming unit 23.

The method in the embodiment corresponding to FIG. 1 may be implemented by the image display device provided by this embodiment.

In an optional implementation manner of this embodiment of the present invention, the obtaining unit 21 may specifically obtain the second RGB parameter corresponding to a second gamma value according to the first RGB parameter of the pixel of the image and a first gamma value corresponding to the first RGB parameter, where a second transmittance of the second RGB parameter is equal to a first transmittance of the first RGB parameter.

Optionally, for an application of color enhancement adjustment, the second gamma value is greater than the first gamma value.

Optionally, for an application of color weakening adjustment, the second gamma value is less than the first gamma value.

Optionally, in an application scenario of this embodiment, the image display device may selectively transform the R parameter, the G parameter, and the B parameter in the first RGB parameter (if there is no need to transform a parameter in the first RGB parameter, a gamma value corresponding to a parameter in the second RGB parameter may be considered to be equal to the first gamma value) or separately transform the R parameter, the G parameter, and the B parameter in the first RGB parameter, thereby implementing an adjustment of selective transformation. For example, a parameter to be transformed or a transformation amplitude is selected according to a theme type or a scenario type of a terminal on which the display device is located. For example, the second gamma value may include a gamma value corresponding to the R parameter in the second RGB parameter, a gamma value corresponding to the G parameter in the second RGB parameter, and a gamma value corresponding to the B parameter in the second RGB parameter, that is, the gamma value corresponding to the R parameter in the second RGB parameter is one value, and the gamma value corresponding to the G parameter and the B parameter is another value. For another example, the second gamma value may include the gamma value corresponding to the R parameter and the G parameter in the second RGB parameter, and the gamma value corresponding to the B parameter in the second RGB parameter, that is, the gamma value corresponding to the R parameter and the G parameter in the second RGB parameter is one value, and the gamma value corresponding to the B parameter is another value. For another example, the second gamma value may include the gamma value corresponding to the R parameter and the B parameter in the second RGB parameter, and the gamma value corresponding to the G parameter in the second RGB parameter, that is, the gamma value corresponding to the R parameter and the B parameter in the second RGB parameter is one value, and the gamma value corresponding to the G parameter is another value.

In this embodiment, an obtaining unit transforms, by using a gamma curve (that is, a first gamma value) corresponding to a first RGB parameter and another gamma curve (that is, a second gamma value), the first RGB parameter into a second RGB parameter. As the RGB parameter is transformed by using an exponential relationship, smooth transition in color adjustment can be ensured, and no color spot appears, thereby avoiding an image distortion.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An image display method, comprising:
    transforming, using an obtaining unit and according to a first gamma curve to which a first red, green, blue (RGB) parameter of a pixel of an image belongs, the first RGB parameter into a second RGB parameter on a second gamma curve;
    obtaining, using a first transforming unit, a hue (H) parameter and a value (V) parameter according to the first RGB parameter;
    obtaining, using the first transforming unit, a saturation (S) parameter according to the second RGB parameter;
    obtaining, using a second transforming unit, a third RGB parameter according to the H parameter, the S parameter, and the V parameter; and
    displaying, using a display unit, the pixel according to the third RGB parameter.

2. The method according to claim 1, wherein transforming, according to the first gamma curve to which the first RGB parameter of the pixel of the image belongs, the first RGB parameter into the second RGB parameter on the second gamma curve, specifically comprises obtaining, according to the first RGB parameter of the pixel of the image and a first gamma value corresponding to the first RGB parameter, the second RGB parameter corresponding to a second gamma value, wherein a second transmittance of the second RGB parameter is equal to a first transmittance of the first RGB parameter.

3. The method according to claim 2, wherein the second gamma value is greater than the first gamma value.

4. The method according to claim 2, wherein the second gamma value comprises:
a gamma value corresponding to a red (R) parameter in the second RGB parameter, a gamma value corresponding to a green (G) parameter in the second RGB parameter, and a gamma value corresponding to a blue (B) parameter in the second RGB parameter; or
a gamma value corresponding to an R parameter and a G parameter in the second RGB parameter, and a gamma value corresponding to a B parameter in the second RGB parameter; or
a gamma value corresponding to an R parameter and a B parameter in the second RGB parameter, and a gamma value corresponding to a G parameter in the second RGB parameter; or
a gamma value corresponding to an R parameter, a G parameter, and a B parameter in the second RGB parameter.

5. The method according to claim 2, wherein the second gamma value comprises:
a gamma value corresponding to a red (R) parameter in the second RGB parameter, a gamma value corresponding to a green (G) parameter in the second RGB parameter, and a gamma value corresponding to a blue (B) parameter in the second RGB parameter; or
a gamma value corresponding to an R parameter and a G parameter in the second RGB parameter, and a gamma value corresponding to a B parameter in the second RGB parameter; or
a gamma value corresponding to an R parameter and a B parameter in the second RGB parameter, and a gamma value corresponding to a G parameter in the second RGB parameter; or
a gamma value corresponding to an R parameter, a G parameter, and a B parameter in the second RGB parameter.

6. The method according to claim 3, wherein the second gamma value comprises:
a gamma value corresponding to a red (R) parameter in the second RGB parameter, a gamma value corresponding to a green (G) parameter in the second RGB parameter, and a gamma value corresponding to a blue (B) parameter in the second RGB parameter; or
a gamma value corresponding to an R parameter and a G parameter in the second RGB parameter, and a gamma value corresponding to a B parameter in the second RGB parameter; or
a gamma value corresponding to an R parameter and a B parameter in the second RGB parameter, and a gamma value corresponding to a G parameter in the second RGB parameter; or
a gamma value corresponding to an R parameter, a G parameter, and a B parameter in the second RGB parameter.

7. An image display device, comprising:
an obtaining unit configured to transform, according to a first gamma curve to which a first red, green, blue (RGB) parameter of a pixel of an image belongs, the first RGB parameter into a second RGB parameter on a second gamma curve;
a first transforming unit configured to obtain a hue (H) parameter and a value (V) parameter according to the first RGB parameter, and obtain a saturation (S) parameter according to the second RGB parameter;
a second transforming unit configured to obtain a third RGB parameter according to the H parameter, the S parameter, and the V parameter; and
a display unit configured to display the pixel according to the third RGB parameter.

8. The device according to claim 7, wherein the obtaining unit is specifically configured to obtain, according to the first RGB parameter of the pixel of the image and a first gamma value corresponding to the first RGB parameter, the second RGB parameter corresponding to a second gamma value, wherein a second transmittance of the second RGB parameter is equal to a first transmittance of the first RGB parameter.

9. The device according to claim 8, wherein the second gamma value is greater than the first gamma value.

10. The device according to claim 8, wherein the second gamma value comprises:
a gamma value corresponding to a red (R) parameter in the second RGB parameter, a gamma value corresponding to a green (G) parameter in the second RGB parameter, and a gamma value corresponding to a blue (B) parameter in the second RGB parameter; or
a gamma value corresponding to an R parameter a G parameter in the second RGB parameter, and a gamma value corresponding to a B parameter in the second RGB parameter; or
a gamma value corresponding to an R parameter and a B parameter in the second RGB parameter, and a gamma value corresponding to a G parameter in the second RGB parameter; or
a gamma value corresponding to an R parameter, a G parameter, and a B parameter in the second RGB parameter.

11. The device according to claim 8, wherein the second gamma value comprises:
a gamma value corresponding to a red (R) parameter in the second RGB parameter, a gamma value corresponding to a green (G) parameter in the second RGB parameter, and a gamma value corresponding to a blue (B) parameter in the second RGB parameter; or
a gamma value corresponding to an R parameter and a G parameter in the second RGB parameter, and a gamma value corresponding to a B parameter in the second RGB parameter; or
a gamma value corresponding to an R parameter and a B parameter in the second RGB parameter, and a gamma value corresponding to a G parameter in the second RGB parameter; or
a gamma value corresponding to an R parameter, a G parameter, and a B parameter in the second RGB parameter.

12. The device according to claim 9, wherein the second gamma value comprises:
a gamma value corresponding to a red (R) parameter in the second RGB parameter, a gamma value corresponding to a green (G) parameter in the second RGB parameter, and a gamma value corresponding to a blue (B) parameter in the second RGB parameter; or
a gamma value corresponding to an R parameter and a G parameter in the second RGB parameter, and a gamma value corresponding to a B parameter in the second RGB parameter; or
a gamma value corresponding to an R parameter and a B parameter in the second RGB parameter, and a gamma value corresponding to a G parameter in the second RGB parameter; or a gamma value corresponding to an R parameter, a G parameter, and a B parameter in the second RGB parameter.

13. The method according to claim 2, wherein the second gamma value is less than the first gamma value.

14. The device according to claim 8, wherein the second gamma value is less than the first gamma value.

15. A method comprising:
calculating, using an obtaining unit, a first transmittance of a pixel based on a first red, green, blue (RGB) parameter of the pixel and a first gamma value;
setting, using the obtaining unit, a second transmittance equal to the first transmittance;
calculating, using the obtaining unit, a second RGB parameter based on the second transmittance and a second gamma value;
calculating, using a first transforming unit, a hue (H) component and a value (V) component based on the first RGB parameter;
calculating, using the first transformation unit, a saturation (S) component based on the second RGB parameter;
calculating, using a second transforming unit, a third RGB parameter based on the H component, the S component, and the V component; and
displaying, using a display unit, a modified pixel based on the third RGB parameter.

16. The method of claim 15, wherein the second gamma value is greater than the first gamma value.

17. The method of claim 15, wherein the second gamma value is less than the first gamma value.

18. The method of claim 15, wherein the calculating the S component comprises substantially maintaining the first transmittance.

19. The method of claim 15, wherein the first transmittance is expressed as $T1=(X/255)^A$, where T1 is the first transmittance, X is the first RGB parameter, and A is the first gamma value.

20. The method of claim 19, wherein the second transmittance is expressed as $T2=(X'/255)^B$, where T2 is the second transmittance, X' is the second RGB parameter, and B is the second gamma value.

* * * * *